Nov. 17, 1942. F. I. RAYMOND Re. 22,223
VALVE FOR VENTING AIR FROM RADIATORS
Filed May 18, 1942
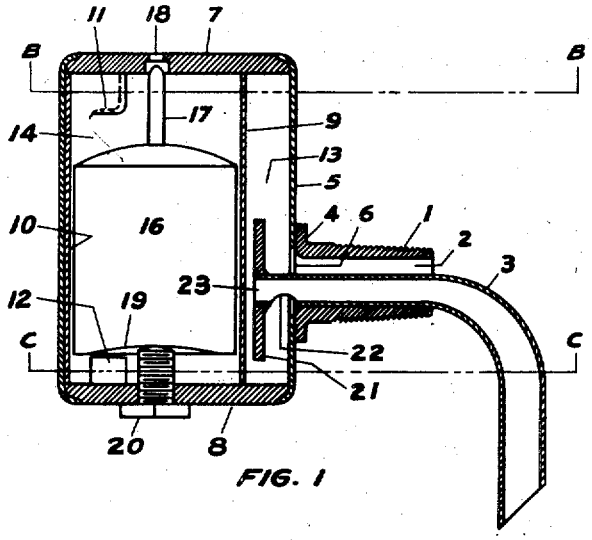
FIG. 1
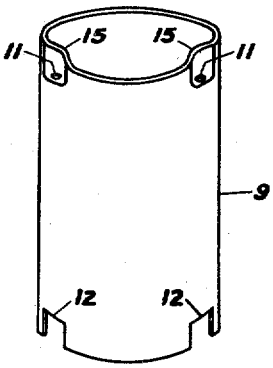
FIG. 2
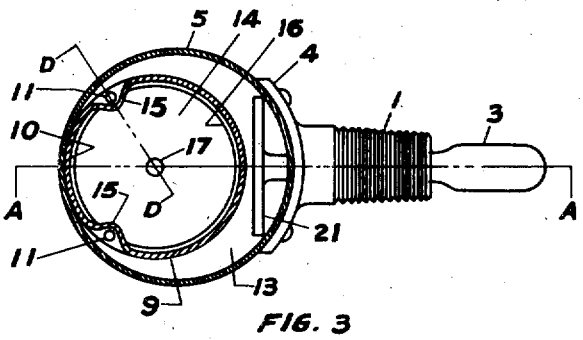
FIG. 3
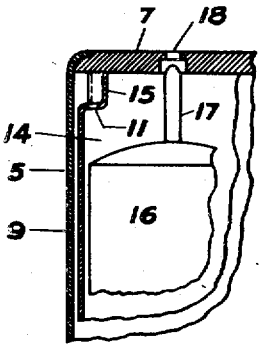
FIG. 5
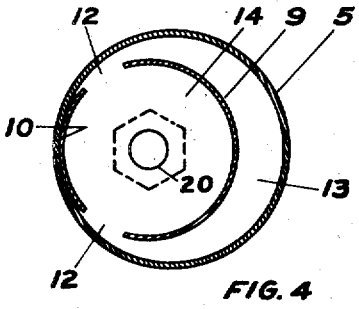
FIG. 4
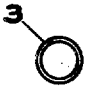
INVENTOR.
Fred I. Raymond
BY: Wallace and Cannon
ATTORNEYS.

Reissued Nov. 17, 1942 Re. 22,223

UNITED STATES PATENT OFFICE 22,223

VALVE FOR VENTING AIR FROM RADIATORS

Fred I. Raymond, Chicago, Ill.

Original No. 2,242,546, dated May 20, 1941, Serial No. 241,547, November 21, 1938. Application for reissue May 18, 1942, Serial No. 443,530

17 Claims. (Cl. 137—122)

My invention relates to improvements in automatic valves for venting air from the radiators and pipes of steam and hot water heating systems, and wherever a similar valve is required.

The objects of my improvements are first to provide a valve which will not spit water when a mixture of air, or steam, and water is passing into the valve; second, to provide a valve which will permit rapid venting of air at low pressures, for example 1 to 3 ounces per square inch, and which will also prevent too rapid venting at high pressures; third, to provide a valve which will not spit water under conditions of surging in the radiator; fourth, to provide a valve which will have a constant venting rate at all pressures above a predetermined minimum pressure; and fifth, to provide a valve which will clear itself of water at all times when air accumulates in the space to be vented.

Other objects will be apparent from the specification.

My first object is of particular importance because the valves for this purpose known to the art have had a tendency to spit water when a mixture of air and water, or steam and water, was entering the valve. It is believed that this spitting was caused by a mixture of air and water in the form of bubbles coming in contact with the float, the mixture having insufficient density to lift the float and close the valve. To attain this object, I have made provision to more effectively separate the air from the water after the mixture enters the valve and before it enters the float chamber to the end that in my improved valve it is not possible for bubbles to come in contact with the float.

My second object is important because fast venting at low pressures is desirable, especially in one pipe steam systems, in order that the radiators and pipes may heat quickly at low pressures. This fast venting at low pressures can be attained easily by providing a large venting port in any customary valve, but the large port will then permit too rapid venting at high pressures. Some recent valves have been built with two ports, a larger one and a smaller one, the larger one being closed at high pressures in an effort to attain my object. My valve, however, is constructed so that the float rises and throttles the single port opening to reduce the venting rate at high pressures.

My third object is important more especially when the valve is used to vent air from the radiators of a forced circulation hot water heating system. In this application it has been found that valves known to the art spit water when the circulating pump starts or stops. Apparently the starting and stopping of the pump causes a surge that makes the valve spit water. In my valve a surge causes the valve to close, thereby overcoming this difficulty.

My fourth object is in reality a continuation of my second object which was to permit fast venting at low pressures without too fast venting at high pressures. Having attained my second object, I find it is desirable to go further and not merely reduce the venting rate below what it would be with the single large port, but also to control the venting rate and hold it substantially constant whenever the pressure is above a predetermined maximum low pressure. This fourth object is important because it tends to cause the last radiators, especially in one pipe steam systems, to heat at the same rate as the closer radiators. For example, if my valves are applied to all the radiators, and if they are designed to maintain a constant venting rate at all pressures above 3 ounces per square inch, then whenever the pressure is above 3 ounces throughout the entire system, the last radiators will be venting air at the same rate as the closer radiators.

My fifth object is important because it has been possible to build a valve along customary lines which would not spit water if certain water and air passages were made small in cross section area. However, these small passages often became sealed by water held in them by surface tension or capillary attraction so that the float chamber did not drain properly when the water receded in the space to be vented. These valves then remained in the closed position to prevent proper venting.

In my valve, all passages for water are large in cross section area so that the water drains out quickly when the water recedes in the space to be vented.

My invention will be readily understood from the following description and the accompanying drawing, in which a preferred embodiment is shown, in which;

Fig. 1 is a vertical cross section of the valve on line AA of Fig. 3.

Fig. 2 is a perspective view of the inner shell.

Fig. 3 is a horizontal cross section of the valve on line BB of Fig. 1.

Fig. 4 is a horizontal cross section of the valve on line CC of Fig. 1.

Fig. 5 is a fragmentary cross section through the valve on line DD of Fig. 3.

Similar numerals refer to similar parts throughout the several views.

Referring to the drawing, the reference character 1 indicates a nipple, usually threaded for ⅛" standard pipe thread, and screwed into the radiator or other space to be vented. The character 2 indicates the opening through the nipple 1. Syphon 3 inserted in nipple 1 depends downwardly into the radiator in the customary manner.

Nipple 1 is flanged at its other end as at 4 and mounted on this flange is the outer shell 5 of the valve. The opening 6 in shell 5 is located opposite the opening 2 through nipple 1 to provide communication between the radiator and the inside of shell 5 through openings 2 in nipple 1 and 6 in shell 5. A valve head 7 and a valve bottom 8 are held in place by rolling over the ends of shell 5 as shown and also by solder.

The inner shell 9 is mounted inside shell 5 and extends from the bottom of head 7 to the top of bottom 8. It will be noticed that inner shell 9 acts as a spacer to hold head 7 and bottom 8 during assembly. The inner shell 9 is spaced eccentrically inside shell 5 as shown in Figs. 3 and 4. It may be held in place by solder along the line 10 where shell 9 touches shell 5. The upper edge of shell 9 may also be soldered to the bottom of head 7 to form an air tight joint between them.

The inner shell 9 is provided with a pair of openings 11, 11 in the upper portion of the shell and a pair of openings 12, 12 in the lower portion of the shell, to provide communication between the chamber 13 formed between the outer shell 5 and the inner shell 9 and the chamber 14 within the shell 9. The upper portion of shell 9 is provided with a pair of indented portions 15, 15 and the openings 11 are drilled in the bottom thereof as shown in Figures 2 and 5, so that any air or water passing through openings 11 from chamber 13 will be directed downwardly into chamber 14.

It should be noted that the openings 11 and 12 are not necessarily required to be in pairs since single openings could be used. However, in the embodiment shown it is desirable to use pairs of openings as shown. The size of openings 11 is critical in the operation of my valve as will be hereinafter described. It will be noted in the drawing that openings 11 are located on the side of shell 9 which is away from nipple 1 so that any fluids entering chamber 13 from the radiator will have to travel around shell 9 before entering through openings 11 into chamber 14.

Openings 12 in shell 9 are slotted in the shell in any suitable manner, and openings 12 will ordinarily be located approximately below openings 11. The size of openings 12 is not particularly critical except that they must be large enough to permit very free flow through them to and from chambers 13 and 14. The top of openings 12 should also be substantially lower than the bottom of the opening 2 through nipple 1 for the reasons hereinafter stated.

Disposed within chamber 14 is float 16 carrying pin 17 which cooperates with port 18 in the head 7 to form a valve. Float 16 is of customary design and is provided with a flexible concave bottom 19. Float 16 is charged with a few drops of a volatile liquid in customary manner.

Float 16, when it is not supported by water, rests on a threaded post 20 screwed into the bottom member 8. Post 20 is of proper length to allow pin 17 to clear port 18 and thereby open the valve formed by pin 17 and port 18 when the bottom 19 of the float 16 is in the convex position as shown. When float 16 is heated, the volatile liquid vaporizes and forces float bottom 19 downwardly against post 20 thereby raising the pin 17 to close port 18 in customary manner.

The bottom of float 16, it will be noted, is approximately on a level with the top of openings 12. By keeping this relation between the level of the bottom of float 16 and the top of openings 12, these openings, which are of large size, prevent bubbles of air from being entrapped below the float.

Syphon 3 is held in place by a washer 21 within the chamber 13. It will be noted that washer 21 is relatively large in diameter, so that syphon 3 cannot pull the washer outwardly and thereby close or restict the opening 6 into chamber 13 from nipple 1.

Syphon 3 is provided with an opening 22 just inside washer 21 so that syphon 3 may be in unrestricted communication with chamber 13 at times when the opening 23 through syphon 3 might be closed or restricted by being close to the outside of shell 9.

It will be noted that syphon 3 does not extend through the shell 9 and therefore does not communicate with chamber 14 except through chamber 13 and openings 11 and 12.

*Starting operation.*—In order that my improved valve shall function properly, it is necessary that the lower part of chambers 13 and 14 shall be filled with water. After the valve is installed it will therefore fail to perform all of its desired functions until water from the space to be vented reaches the valve and fills the lower part of chambers 13 and 14.

If water reaches the valve before steam reaches the valve, this water will immediately fill the lower parts of chambers 13 and 14. If steam reaches the valve before water, then this steam will condense and fill the lower parts of chambers 13 and 14. From that time on, the water will remain in the lower part of chambers 13 and 14 up to the level of the bottom of the opening 2 in nipple 1.

*Normal operation.*—During normal operation, as has just been explained under "Starting operation," chambers 13 and 14 will be filled at all times with water up to, or nearly up to, the level of the bottom of the opening 2 in nipple 1.

I will now describe the normal operation of the valve when applied to a radiator of a one pipe steam heating system.

As the pressure increases above atmospheric pressure in the radiator due to steam pressure in the heating system, air will pass from the radiator, through nipple 1, chamber 13, openings 11, chamber 14 and port 18 to the atmosphere. It will be noted that air cannot pass from chamber 13 into chamber 14 through openings 12 because these openings are sealed with water.

The size of openings 11 is carefully predetermined so as to restrict the flow of air through them from chamber 13 to chamber 14. This will cause a pressure drop between the two chambers whenever air is flowing through openings 11, and this pressure drop will cause water in the bottom of chamber 13 to flow through openings 12 into chamber 14 and raise float 16 to close or partially close port 18. The dimensions of the chambers 13 and 14 are predetermined so that the volume of water held in chamber 13 below the bottom of the opening 2 in nipple 1 and above the top of openings 12, will be sufficient to raise float 16 without allowing the water level in chamber 13 to fall below the top of openings 12.

At very low pressures in the radiator, the rate of air flow through openings 11 will be so low that the pressure drop between the chambers will be insufficient to force water from the bottom of chamber 13 into chamber 14 to the height required to raise the float 16. At low pressures in the radiator, therefore, port 18 will remain wide open to give the fastest possible venting rate.

As the pressure in the radiator is increased, the rate of air flow through openings 11 will increase and thereby increase the pressure drop between chambers 13 and 14. When this pressure drop is sufficient to cause water to flow from chamber 13 into chamber 14 to the height which will raise the float, the float 16 will then rise and cause pin 17 to close or partially close port 18. Closing port 18 immediately cuts down the rate of air flow from chamber 14 to the atmosphere and consequently from chamber 13 into chamber 14 through openings 11. This in turn reduces the pressure drop between the chambers and allows float 16 to fall.

It will be seen from the foregoing that the openings 11 act like the orifice of a flowmeter to reflect the rate of air flow through the valve. Chambers 13 and 14 with openings 12 act like the water filled U tube of a flow meter to measure the pressure drop between the chambers. Accordingly, float 16 operates in response to conditions in this U tube to control the rate of air flow through the valve. The valve functions, therefore, to maintain a constant rate of air flow from the radiator whenever the pressure in the radiator is above that which causes a rate of air flow through openings 11 sufficient to cause float 16 to rise.

By proper selection of the size of openings 11 and port 18, I am able to obtain the flow characteristics I desire. At the present time I am selecting a size for openings 11 which causes the float to rise when the pressure in the radiator exceeds 3 ounces per square inch. However, it is to be understood that the size of these openings may be varied considerably. For example, I believe there will be applications where it will be desirable to use openings 11 of a smaller size which will cause the float to rise whenever the pressure in the radiator is above 1 ounce per square inch.

So far I have described the operation of the valve under conditions of no water in the radiator, and the very nature of the operation described will tend to vent the radiator in such a manner that no water will accumulate in the radiator.

However, if water should accumulate in the radiator, as it may under certain conditions, the valve will operate in the following manner.

If a mixture of air and water enters the valve through nipple 1 it will pass into chamber 13. A separation will occur in chamber 13, the water falling to the bottom and the air rising to the top. Although there will be no well defined water level in chamber 13 at such times because of bubbles, there will nevertheless be an effective water level which will be higher than the bottom of the opening 2 through nipple 1. This increase in height of the effective water level in chamber 13 will cause less pressure drop to be required across openings 11 to raise float 16. Therefore at times when a mixture of water and air is flowing into the valve, the float will rise and close or throttle port 18 at a lower rate of air flow through openings 11. Therefore the rate of air flow from the radiator through the valve will be reduced during periods when a mixture of air and water is entering the valve. This reduced venting rate will reduce the rate of steam flow into the radiator and will thereby allow the water in the radiator to drain back quickly into the steam pipe feeding the radiator.

During periods when a mixture of air and water is entering the valve, it will be noted that chamber 13 forms a large separating chamber where the air is separated from the water before either enters the float chamber. Due to the pressure drop across openings 11, and also because the level of openings 11 is above the water level required in chamber 14 to raise the float 16, the water will rise in chamber 14 and raise float 16 to close port 18 before any water can flow from chamber 13 into chamber 14 through openings 11.

There is still the possibility that some spray or mist might find its way up to openings 11, and for this reason I have located openings 11 in such a position that they discharge downwardly into chamber 14. Thus any spray or mist which may pass through openings 11 will impinge upon the top of float 16 where the particles of water will adhere by surface tension and drain down the sides of the float.

When my valves are used on all the radiators of a one pipe steam heating system, it will be noted from the above description that if the valves have been designed to throttle above 3 ounces pressure, then all the radiators will be venting air at the same rate when the pressure is above 3 ounces throughout the system. If the steam mains of such a system have been equipped with very large air vents at the ends of the mains, and if these vent very freely at very low pressures, then the mains will fill quickly when steam is turned into the system, and not much air will be vented from the first radiators during the period while the mains are filling with steam. As soon as the steam main vents are closed by the presence of steam therein, the pressure in the system will rise abruptly and it will be only a short time before the pressure throughout the system is above the 3 ounces required to cause my valves to throttle and maintain the same rate of air flow from all the radiators. Thus my air valves if used on all the radiators of a one pipe steam heating system in combination with large size low pressure venting valves at the ends of the steam mains will tend to produce more uniform heating of all the radiators.

When used on radiators or mains of a forced circulation hot water heating system, my improved valves tend to overcome the difficulty resulting from the surging caused by the starting and stopping of the circulating pump. This is because of the restricted size of openings 11 and the unrestricted size of openings 12. A surge will cause water to flow quickly through openings 12 and raise float 16 to close the valve before air can flow through the restricted openings 11 and allow water to follow through openings 11.

It will be noted that the eccentric spacing of shell 9 inside shell 5 produces a relatively large horizontal cross sectional area in chamber 13 at the point where fluids enter the valve through nipple 1. This allows quicker separation of the air from the water than would be the case if shell 9 were located concentrically in shell 5. This additional space in chamber 13 at the point of connection to nipple 1 also provides ample space for washer 21 so that the passages from nipple 1 to chamber 13 around washer 21 will be large.

For the ordinary conditions of venting air from radiators, I find that the syphon 3 can be omitted from my valve, and that it will function equally as well without it. However, I find that if a sudden surge of water enters the valve there will be times when both the chambers 13 and 14 become filled with water to a level above that required to raise the float. At such times the float will remain closed until the water in chambers 13 and 14 is returned to the radiator. I have observed by studying glass models that if no syphon is used there will be times when surface tension forms a film across the radiator end of nipple 1, and this film is strong enough to hold water in the valve and thereby hold it closed. By using the syphon 3 this condition is eliminated.

It is this same surface tension condition, I believe, which causes previous valves having small passages to stay closed or "water bound" even when a syphon is used. By using the syphon tube, and also avoiding all small passages inside the valve, I obtain a valve which is free from this trouble of "water binding."

It has been noted that openings 12 are preferably located on the opposite side of shell 9 from nipple 1. This location removes the possibility of air bubbles flowing directly from nipple 1 through openings 12 but it is important for another reason. After steam has been turned off in the system or in the radiator, air will be drawn back through my valve into the radiator. If this reverse flow of air is rapid, there will be a reverse pressure drop across openings 11 which will cause air to pass down around float 16 and through openings 12 into chamber 13. If openings 12 were located near nipple 1, the stream of bubbles from openings 12 to nipple 1 would draw water from chamber 13 into nipple 1 and thereby deplete the water supply in the bottom of chamber 13. However, if openings 12 are located around the bend of shell 9 as shown, the bubbles coming through openings 12 will rise and break at a point away from nipple 1 so that the water supply in the bottom of chamber 13 will not be depleted.

I claim:

1. In a valve for venting air from radiators of steam and hot water heating systems, an outer casing, a separating chamber within said casing, means providing a float chamber within said casing adjacent said separting chamber, a float in said float chamber, a passage between the upper part of the float chamber and the atmosphere, means operated by said float to close said passage when the float rises, means providing an inlet passage for the separating chamber and adapted to be connected to a space to be vented, means providing an upper passage between the upper part of the float chamber and the upper part of the separating chamber, means providing a lower passage between the lower part of the float chamber and the lower part of the separating chamber, said upper passage between the float chamber and the separating chamber being restricted in size as compared to the size of said lower passage, said lower passage between the float chamber and the separating chamber being closed to the passage of gases by a water seal, the volume of water in the separating chamber side of said water seal being greater than the volume of water required in the float chamber to raise said float, said float chamber being in communication with said inlet passage solely through said separating chamber, said float and separating chambers being cylindrical in shape with the float chamber of smaller diameter disposed within the separating chamber, the upper passage between these chambers being located on the side of the float chamber which is away from said inlet passage, and said float chamber being disposed eccentrically in said separating chamber and remote from said inlet passage.

2. In a valve for venting air from radiators of steam and hot water heating systems, an outer casing, a separating chamber within said casing, means forming a float chamber within said casing adjacent said separating chamber, a float in said float chamber, means forming a vent passage between the upper part of the float chamber and the atmosphere, means operated by said float to close said vent passage when the float rises, means providing an inlet passage for said separating chamber adapted to be connected to a space to be vented, means forming an upper passage between the upper part of the float chamber and the upper part of the separating chamber, means providing a lower passage between the lower part of the float chamber and the lower part of the separating chamber, said upper passage between the float chamber and the separating chamber being restricted in size as compared to the size of said lower passage, said float chamber being in communication with said inlet passage solely through said separating chamber, said float and separating chambers being cylindrical in shape with the float chamber of smaller diameter disposed within the separating chamber, the upper passage between these chambers being located on the side of the float chamber which is away from said inlet passage, and said float chamber being disposed eccentrically in said separating chamber and away from said inlet passage.

3. In a valve for venting air from radiators of steam and hot water heating systems, means including an outer casing providing a separating chamber within said casing, means forming a float chamber within said casing adjacent said separating chamber, a float in said float chamber, means forming a vent port between the upper part of the float chamber and the atmosphere, means operated by said float to close said port when the float rises, means forming an inlet passage adapted to be connected with a space to be vented, means forming an upper passage between the upper part of the float chamber and the upper part of the separating chamber, a lower passage between the lower part of the float chamber and the lower part of the separating chamber, said lower passage between the float chamber and the separating chamber being closed to the passage of gases by a water seal, the volume of water in the separating chamber side of said water seal being greater than the volume of water required in the float chamber to raise said float, said float chamber being in communication with said inlet passage solely through said separating chamber, said float and separating chambers being cylindrical in shape with the float chamber of smaller diameter disposed within the separating chamber, the upper passage between these chambers being located on the side of the float chamber which is away from said inlet passage, and said float chamber being disposed eccentrically in said separating chamber and away from said inlet passage.

4. In a vent valve for use with steam or hot water heating systems or the like, the combination of a casing having means forming an inlet passage adapted for connection with a space to be vented, said casing having means forming a vent port therefor, a valve member for closing said port, a float for moving said valve member to closed position, said casing having water-trap means formed to trap a normal body of water therein about the lower end of said float at a level which normally exerts a slight buoyant action on the valve member but is normally insufficient to actuate said valve member to closed position, metering means in said casing stationary relative to movement of and independent of said float and operable to meter the rate of air flow from said inlet passage to said vent port, said metering means being operatively associated with said water-trap means and operable upon the water trapped in said water-trap means in response to the metering of more than a predetermined rate of air flow to induce a variation in the level of said body of water sufficient to move said valve member to closed relation to said vent port.

5. In a vent valve for use with steam or hot water heating systems or the like, the combination of a casing having means forming an inlet passage adapted for connection with a space to be vented, said casing having means forming a vent port therefor which with said inlet passage and said casing affords a normally open discharge passage through said vent valve, a valve member for closing said vent port to shut off flow through said discharge passage, a float operable by greater than a predetermined water level in said casing to move said valve member to closed position, and gas-pressure operated valve actuating means operatively associated with said float and valve member, but mounted and supported in said casing structurally independently of said float and of said valve member and responsive to greater than a predetermined gaseous pressure at said inlet passage and cooperating with said float and said valve member to urge said valve member toward closed position and thereby restrict the flow of air through said vent port.

6. In a vent valve for use with steam or hot water heating systems or the like, the combination of means providing a separating chamber having an inlet passage adapted for connection with a space to be vented and providing a float chamber, said means providing a large area passage connecting the lower ends of said chambers and adapted to form a water seal between the lower ends of said chambers when water is present therein to a predetermined normal level, said float chamber having means forming a vent port therefor in the upper portion thereof, a float valve in said float chamber operable when the water level rises in said float chamber above said normal level to close said vent port, and means forming a restricted passage between said chambers at a substantial distance above said normal water level to control and restrict the flow of air, gas and other fluids between said chambers and thereby induce a pressure differential effective on opposite sides of said water seal to cause operation of said float valve.

7. In a vent valve of the character described, the combination of means providing a separating chamber and a float chamber connected by a large area passage at their lower ends, means associated with said separating chamber and providing an inlet adapted for connection with a space to be vented and opening into said separating chamber at an effective level operable normally to trap water therein to a normal level producing a water seal in said passage between said chambers, said separating chamber being of a substantially greater volume below said normal water level than the volume of said float chamber below said level, said float chamber having means providing a vent port therefrom to atmosphere and said float chamber having means forming a restricted passage from the upper portion of said separating chamber into the upper portion of said float chamber, a valve member for closing said port, and a float in said float chamber responsive to the water level therein and operable in response to elevation of such water above said normal level to shift said valve member toward closed position.

8. An air vent valve of the character described comprising casing means defining a float chamber and a separation chamber and having means defining a water trap of substantial cross sectional area in each of said float chamber and said separation chamber, said water traps being in communication with each other, said float chamber having means providing a vent port formed therefrom to atmosphere and having a float valve therein adapted when actuated by water in said float chamber to close said vent port, means providing an inlet passage to said separation chamber through which fluids such as air and water may enter said separation chamber, said float chamber having means providing an air passage of restricted area from the upper portion of said separation chamber, said restricted air passage being operable in response to a predetermined flow of air therethrough to induce a differential pressure relation between said float chamber and said separation chamber and thereby cause the level of water in said float chamber to rise and cause closure of said vent port.

9. In a vent valve for use with steam or hot water heating systems or the like, the combination of means providing a separating chamber having an inlet passage adapted for connection with a space to be vented, and providing a float chamber, said means providing a large area passage connecting the lower ends of said chambers and adapted to form a water seal therebetween when water is present therein to a predetermined normal level, said float chamber having means providing a vent port to atmosphere from the upper portion of said float chamber, a float valve in said chamber operable when the water level rises in said float chamber above said normal level to close said vent port, and means forming a restricted passage between said chambers at a point above said water level and operable upon fluids moving from the separating chamber into said float chamber to direct such fluids downwardly into said float chamber and away from said vent port.

10. In a vent valve of the character described, the combination of means providing a separating chamber and providing a float chamber, said means providing a large area passage connecting the lower ends of said chambers and adapted to form a water seal between the lower ends of said chambers when water is present therein to a predetermined level, said float chamber having means forming a vent port therefor in the upper portion thereof, a float valve in said float chamber operable when the water level rises in said float chamber above said normal level to close said vent port, means providing an inlet passage at one side of said separating chamber adapted for connection with a space to be vented, and means forming a restricted passage between said chambers adjacent to the other side of said separating chamber and at a substantial distance above said normal water level to control and restrict the flow of fluids between said chambers and thereby induce a pressure differential effective on opposite sides of said water seal.

11. A vent valve for venting gases from a space such as a radiator of a heating system which may contain liquids and gases in varying proportions, said vent valve comprising a hollow casing having outer top, side and bottom walls and inner wall means cooperating to define a float chamber and a separating chamber both of substantial horizontal cross-sectional area, means defining a vent port from an upper portion of said float chamber to atmosphere, a float valve in said chamber operable upon rise of liquid in said float chamber above a predetermined level to close said vent port, said inner wall means being formed to provide an upper passage leading from an upper portion of said separating chamber above said predetermined water level into said float chamber, said inner wall means being formed to provide a lower passage between the lower portions of said chambers, and means for connecting said vent valve to a space to be vented and having a passage therein constituting the sole path of entry of gases or liquids or mixtures thereof into said valve and constituted and arranged to discharge only into said separating chamber in such relation with the inner wall means and said lower passage that gas discharged therefrom will pass directly to said upper passage and into said float chamber and liquid discharged therefrom will pass directly through said lower passage and a mixture of gas and liquid discharged therefrom will collect in the separating chamber by reason of the buoyancy thereof whereby the gas and liquid of the mixture may separate and flow as aforesaid and thereby prevent gas from bubbling through liquid in said float chamber.

12. In a valve for venting air from radiators and the like, a casing, a float in said casing, means dividing the interior of said casing into two chambers, one of said chambers being disposed around said float so as to constitute a float chamber in which the float will rise and fall in response to changes of the level of liquids in said chamber, the other of said chambers having sufficient cross-sectional area, breadth and height to permit and facilitate the rapid separation of gases and liquids therein as a mixture of gases and liquids passes therethrough, said other chamber thereby constituting a separating chamber, a valved passage between said float chamber and the atmosphere, said valved passage thereby constituting an outlet passage for the valve, means operated by said float to close said outlet passage when the float rises due to the rising of liquids in the float chamber above a predetermined level, means comprising an upper passage between the float chamber and the separating chamber, means comprising a lower passage between the float chamber and the separating chamber, means comprising a passage constituting the sole inlet path along which gas or liquids may enter said valve, said last-named passage thereby constituting an inlet passage for the valve and discharging only into said separating chamber, the bottom of said inlet passage being positioned below said aforementioned predetermined level, said upper passage being positioned above said predetermined level said lower passage being positioned below said predetermined level and out of line with the discharge from said inlet passage, such structure being designed to the end that when any mixture of gases and liquids is entering the valve, such mixture will be discharged into the separating chamber where the gases will travel upwardly through a zone of separation into a zone of gases only and thence into the upper part of the float chamber while the liquids will fall downwardly from the zone of separation into a zone of liquids only and thence flow into the lower part of the float chamber, to the further end that only gases will enter the float chamber above said predetermined level, and only liquids will enter the float chamber below said predetermined level, thereby preventing turbulence in the float chamber which would interfere with the proper functioning of said float.

13. In a valve for venting air from radiators and the like, a casing, a wall mounted in said casing dividing the interior of the casing into a float chamber and a separating chamber, means providing an inlet passage from the exterior of said casing to said separating chamber, means providing an outlet passage from said float chamber to the atmosphere, a valve member for closing said outlet passage, a float in said float chamber operatively connected to said valve member so as to close said outlet passage when said float rises due to the rising of liquids in said float chamber above a predetermined level, means providing an upper passage between the upper part of said separating chamber and the upper part of said float chamber, and means providing a lower passage between the lower part of said separating chamber and the lower part of said float chamber, said wall between said float chamber and said separating chamber being supported independently of said float, and said lower passage being of sufficient size to enable rapid flow of water into the bottom of said float chamber upon entry of a surge of water into said separating chamber and permit and facilitate the rapid equalization of water levels in said chambers.

14. In a valve for venting air from radiators and the like, a casing, a wall mounted in said casing dividing the interior of the casing into a float chamber and a separating chamber, means providing an inlet passage from the exterior of said casing to said separating chamber, means providing an outlet passage from said float chamber to the atmosphere, a valve member for closing said outlet passage, a float in said float chamber operatively connected to said valve member so as to close said outlet passage when said float rises due to the rising of liquids in said float chamber above a predetermined level, means providing an upper passage between the upper part of said separating chamber and the upper part of said float chamber, and means providing a lower passage between the lower part of said separating chamber and the lower part of said float chamber, said wall between said float chamber and said separating chamber being supported independently of said float, said lower passage being of sufficient size to enable rapid flow of water into the bottom of said float chamber upon entry of a surge of water into said separating chamber and permit and facilitate the rapid equalization of water levels in said chambers, and said upper passage being relatively small or restricted in size compared to said lower passage so as to retard the flow of gases through said upper passage.

15. In a valve for venting air from radiators and the like, a casing, a wall mounted in said casing dividing the interior of the casing into a float chamber and a separating chamber, means providing an inlet passage from the exterior of said casing to said separating chamber, means providing an outlet passage from said float chamber to the atmosphere, a valve member for closing said outlet passage, a float in said float chamber operatively connected to said valve member so as to close said outlet passage when said float rises due to the rising of liquids in said float chamber above a predetermined level, means providing an upper passage between the upper part of said separating chamber and the upper part of said float chamber, and means providing a lower passage between the lower part of said separating chamber and the lower part of said float chamber, said wall between said float chamber and said separating chamber being supported independently of said float, said lower passage being of sufficient size to permit and facilitate the rapid equalization of water levels in said chambers, said casing being constructed and arranged and said inlet passage and said lower passage being so related to each other as to trap water in the lower portions of said chambers to a level sufficient to at least substantially seal said lower passage against the passage of air therethrough.

16. In a valve for venting air from radiators and the like, a casing, a wall mounted in said casing dividing the interior of the casing into a float chamber and a separating chamber, means providing an inlet passage from the exterior of said casing to said separating chamber, means providing an outlet passage from said float chamber to the atmosphere, a valve member for closing said outlet passage, a float in said float chamber operatively connected to said valve member so as to close said outlet passage when said float rises due to the rising of liquids in said float chamber above a predetermined level, means providing an upper passage between the upper part of said separating chamber and the upper part of said float chamber, and means providing a lower passage between the lower part of said separating chamber and the lower part of said float chamber, said wall between said float chamber and said separating chamber being supported independently of said float, said lower passage being of sufficient size to enable rapid flow of water into the bottom of said float chamber upon entry of a surge of water into said separating chamber, said upper passage being relatively small or restricted in size compared to said lower passage so as to retard the flow of gases through said upper passage, said casing being constructed and arranged and said inlet passage and said lower passage being so related to each other as to trap water in the lower portions of said chambers to a level sufficient to at least substantially seal said lower passage against the passage of air therethrough.

17. In a valve for venting air from radiators and the like, a casing, a wall mounted in said casing dividing the interior of the casing into a float chamber and a separating chamber, means providing an inlet passage from the exterior of said casing to said separating chamber, means providing an outlet passage from said float chamber to the atmosphere, a valve member for closing said outlet passage, a float in said float chamber operatively connected to said valve member so as to close said outlet passage when said float rises due to the rising of liquids in said float chamber above a predetermined level, means providing an upper passage between the upper part of said separating chamber and the upper part of said float chamber, and means providing a lower passage between the lower part of said separating chamber and the lower part of said float chamber, said wall between said float chamber and said separating chamber being supported independently of said float, said lower passage being of sufficient size to enable rapid flow of water into the bottom of said float chamber upon entry of a surge of water into said separating chamber, said upper passage being relatively small or restricted in size compared to said lower passage so as to retard the flow of gases through said upper passage, said casing being constructed and arranged and said inlet passage and said lower passage being so related to each other as to trap water in the lower portions of said chambers to a level sufficient to completely seal said lower passage against the passage of air from said separating chamber through said lower passage into said float chamber.

FRED I. RAYMOND.